(12) United States Patent
Landsvogt

(10) Patent No.: US 6,567,351 B1
(45) Date of Patent: May 20, 2003

(54) PLAYBACK DEVICE WITH PREDETERMINED, RANDOM FUNCTION FOR SELECTION OF DATA GROUPS

(75) Inventor: Torsten Landsvogt, Hildsheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/341,353

(22) PCT Filed: Jan. 12, 1998

(86) PCT No.: PCT/DE98/00086

§ 371 (c)(1),
(2), (4) Date: Jul. 9, 1999

(87) PCT Pub. No.: WO98/32131

PCT Pub. Date: Jul. 23, 1998

(30) Foreign Application Priority Data

Jan. 15, 1997 (DE) .......................................... 197 01 057

(51) Int. Cl.$^7$ .............................................. G11B 27/00
(52) U.S. Cl. ................................ 369/30.64; 369/30.08; 369/30.9; 369/16
(58) Field of Search .................... 369/30.08, 30.09, 369/30.64, 16, 18, 30.01

(56) References Cited

U.S. PATENT DOCUMENTS

| | | | |
|---|---|---|---|
| 4,706,233 A | * | 11/1987 | d'Alayer de Costemore d'Arc ...................... 369/34.01 |
| 5,051,973 A | * | 9/1991 | Shiba et al. ............. 369/30.06 |
| 5,168,481 A | * | 12/1992 | Culbertson et al. ............ 369/2 |
| 5,189,656 A | * | 2/1993 | Masaki et al. ............. 369/30.3 |
| 5,408,448 A | * | 4/1995 | Carman ................. 369/178.01 |
| 5,696,919 A | * | 12/1997 | Masuno et al. ............. 345/841 |

OTHER PUBLICATIONS

Compact disc player CDP–C745, CDP–S545, 1994, Firma Sony.

* cited by examiner

*Primary Examiner*—Krisna Lim
(74) *Attorney, Agent, or Firm*—Michael J. Striker

(57) ABSTRACT

Proposed is a playback device (1), especially a compact disc changer, which enables a random selection of data groups of recording media to be reproduced in succession. The playback device (1) comprises an input unit (5) and a random generator (10) for random selection of data groups which are stored on recording media, especially compact discs, that can be loaded into the playback device (1) from a magazine (15). The probability that a data group which is selected by the random generator (10) to be reproduced following a data group reproduced by the playback device (1) on a recording medium inserted in the drive (25) of the playback device (1) is stored on the same recording medium can be predetermined.

1 Claim, 1 Drawing Sheet

PLAYBACK DEVICE WITH PREDETERMINED, RANDOM FUNCTION FOR SELECTION OF DATA GROUPS

PRIOR ART

Figure 1:
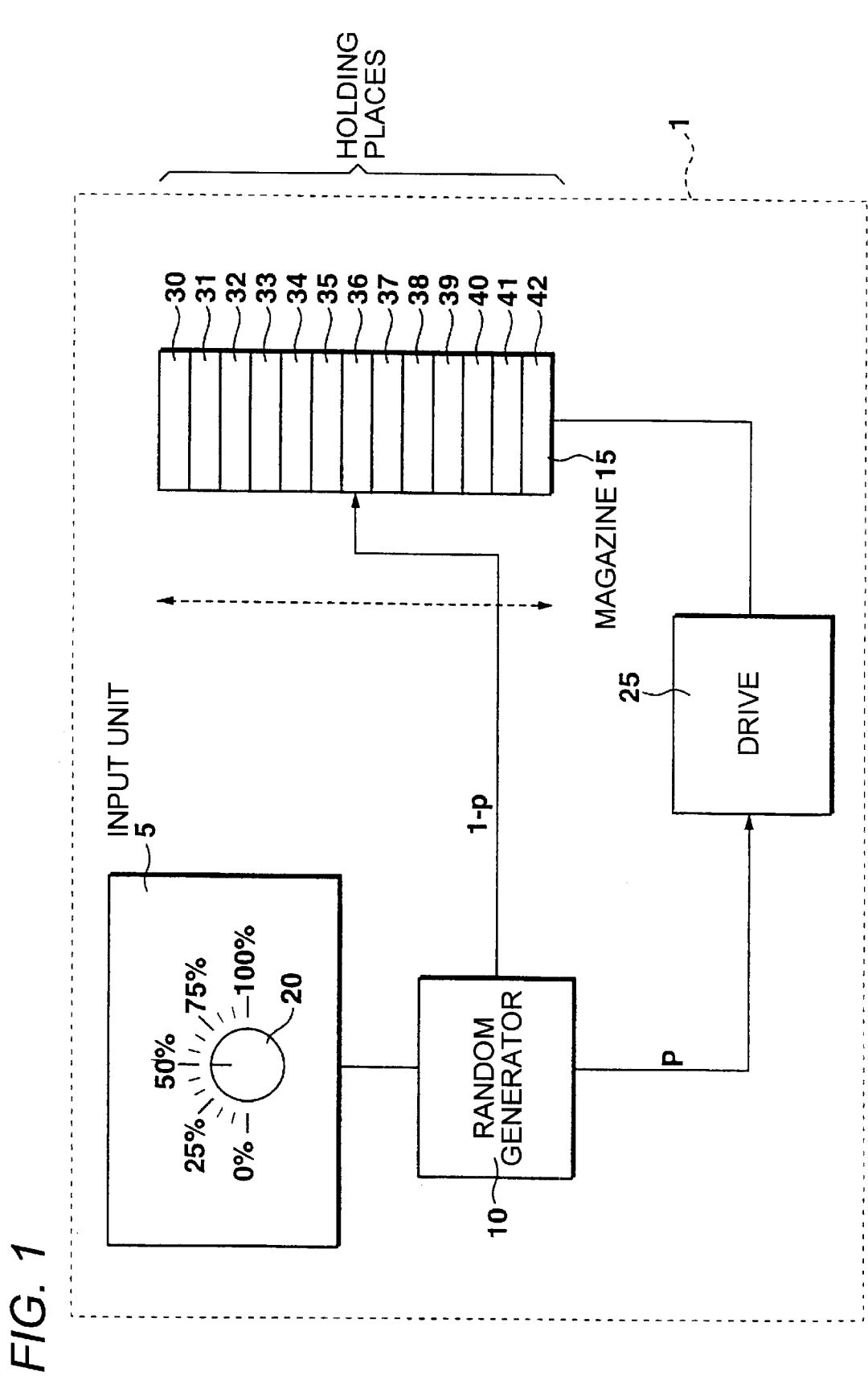

The invention is directed to a playback device according to the generic part of the main claim.

The user's manual "Compact Disc Player CDP-C745, CDP-C545", 1994, by Sony discloses a compact disc changer in which two possibilities are realized for the random selection of titles of the compact disc loaded in the compact disc changer. On the one hand, there is a function enabling random selection of titles of an individual compact disc. On the other hand, a function enabling random selection of titles of all of the compact discs held in the compact disc changer is realized in this compact disc changer.

ADVANTAGES OF THE INVENTION

The playback device according to the invention with the features of the main claim has the advantage over the prior art that by means of presetting the probability for the selection of the data group which is to be reproduced following a data group reproduced by the playback device, wherein both data groups are on the same recording medium, a criterion exists for optional adjustment of an intermediate state between the extreme case of the random selection of titles on only one recording medium and the random selection of titles on alternate different recording media. In this way, an extremely flexible random function for selecting the data groups of recording media held in the playback device can be realized. Further, by presetting the probability in a suitable manner, high mechanical stressing of the playback device due to frequent changing of recording media and long pauses between the individual data groups due to change times can be prevented or at least reduced.

The step indicated in the subclaim makes possible an advantageous further development and improvement of the playback device indicated in the main claim.

In this connection, it is particularly advantageous that the input unit comprises an adjusting element whose setting predetermines the probability that the next selected data group to be reproduced will be on the same recording medium. In this way, the user himself can preset this probability, so that the increased functionality of the playback device can also be influenced by the user and the aforementioned probability can be adjusted according to the requirements of the user.

DRAWING

An embodiment example of the invention is shown in the drawing and described more fully in the following description. The sole FIGURE shows a block diagram of a playback device according to the invention.

DESCRIPTION OF THE EMBODIMENT EXAMPLE

In the FIGURE, reference number 1 designates a playback device which is constructed as a compact disc changer comprising an input unit 5 with an adjusting element 20 constructed as a rotation regulator. The compact disc changer 1 further comprises a magazine 15 with thirteen holding places 30, . . . , 42 for holding recording media in the form of compact discs, a drive 25 for playing back a compact disc which can be loaded from the magazine 15, and a random generator 10 for random selection of compact discs which can be loaded into the drive 25 from the magazine 15. For this purpose, the input unit 5 is connected with the random generator 10, to which both the drive 25 and the magazine 15 are connected. Further, the drive 25 is connected with the magazine 15.

A probability P between 0 and 100% can be adjusted in a continuous manner by the user at the rotation regulator 20 of the input unit 5, wherein, for example, some positions of the rotation regulator are identified by the associated percentage, such as "0%", "25%", "50%", "75%", and "100%". In the FIGURE, the rotation regulator 20 is set to a probability P of 50%. This means that the probability P that a data group, for example, a music title, which is selected by the random generator 10 to be reproduced following a data group of a compact disc loaded in the drive 25 of a compact disc changer 1 and reproduced by the compact disc changer 1 is stored on the same recording medium that is located in the drive 25 is 50%. However, with a probability 1-P which is likewise equal to 50% in the present example, a data group which is stored on a compact disc deposited in one of the holding places 30, . . . , 42 will be selected by the random generator 10 for reproduction following the data group that has just been reproduced by the compact disc changer on the compact disc loaded in the drive 25 of the compact disc changer 1. In this case, the random generator 10 can access any compact disc deposited in the magazine 15, which is illustrated in the FIGURE by the double arrow in dashed lines. In the illustrated embodiment example, the random generator 10 accesses a data group of a compact disc held in the seventh holding place 36 for reproduction following the current reproduction with a probability 1-P.

When the rotation regulator 20 is set to 0, the data group to be reproduced next with a probability of P=100% is stored on a compact disc held in the magazine 15.

When the rotation regulator 20 is set to 100%, the data group to be reproduced next is stored on the compact disc that is currently loaded in the drive 25 for reproduction.

When the random generator 10 needs a compact disc from the magazine 15 for the next data group to be reproduced, then, at the conclusion of the data group that has just been reproduced, the compact disc loaded in the drive 25 for reproduction is exchanged in a manner known to the person skilled in the art for the compact disc in the magazine 15 selected for the next data group to be reproduced.

In another embodiment example, the magazine 15 can also be arranged outside of the playback device 1. Further, the playback device 1 can be a compact disc changer which is connected with a car radio or integrated in a car radio. In this case, the adjusting element 20 can be constructed as an operating control on the user control panel of the car radio.

What is claimed is:

1. Playback device (1), especially a compact disc changer, with an input unit (5) and a random generator (10) for random selection of data groups which are stored on recording media, especially compact discs, that can be loaded into the playback device (1) from a magazine (15), characterized in that the probability that a data group which is selected by the random generator (10) and which is to be reproduced following a data group reproduced by the playback device (1) on a recording medium inserted in the drive (25) of the playback device (1) is stored on the same recording medium can be predetermined, wherein the input unit (5) comprises an adjusting element 920) whose setting predetermines the probability for the selection of the next data group to be reproduced on the same recording medium.

* * * * *